Nov. 29, 1927.
E. H. SMITH
PROCESS OF MAKING TORCH TIPS
Filed Aug. 9, 1926
FIG. 1
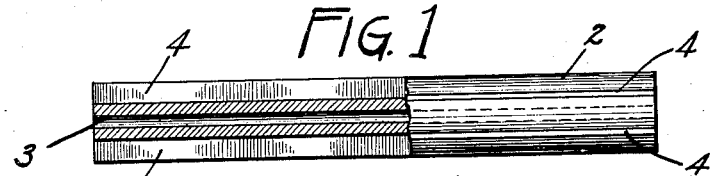
FIG. 2
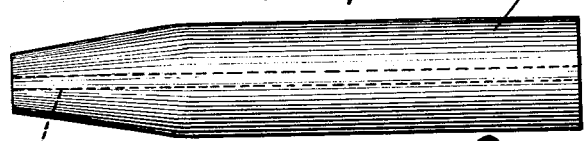
FIG. 3
FIG. 4
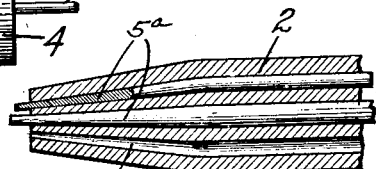
FIG. 6
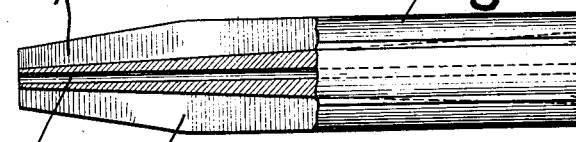
FIG. 5
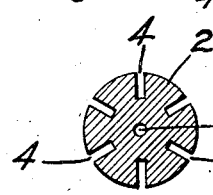   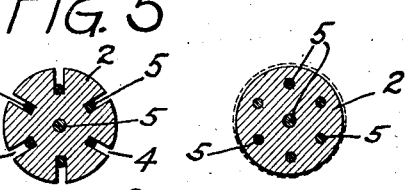   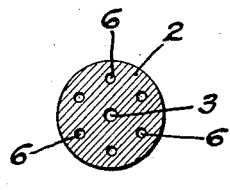
FIG. 7   FIG. 8   FIG. 9   FIG. 10
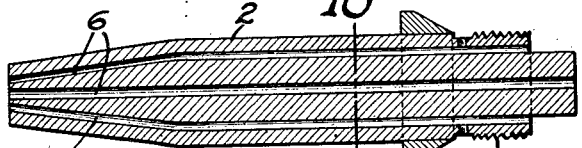
FIG. 11
Inventor
ELMER H. SMITH
ATTORNEYS Patented Nov. 29, 1927.

1,651,232

UNITED STATES PATENT OFFICE.

ELMER H. SMITH, OF MINNEAPOLIS, MINNESOTA.

PROCESS OF MAKING TORCH TIPS.

Application filed August 9, 1926. Serial No. 128,197.

My invention relates to torch tips and particularly those of the oxy-acetylene type and the object of the invention is to provide a tip and a process of making the same which will eliminate the tedious expensive operation of drilling a series of small holes or passages lengthwise through the tip for the passage of gas.

In the manufacture of tips of this kind, it has been customary to drill the gas passages and as these are small and comparatively long, it frequently happens that a drill will be broken and sometimes this occurs when the tip is nearly completed and it is then necessary to throw away the entire tip and begin the work over again. Furthermore, it has been particularly tedious and difficult to form gas passages by means of drills with the passages at one end of the tip converging toward the orifice thereof. With my improved process, gas passages of any suitable length may be formed and the end-portions of these passages may converge without interfering particularly with the successful carrying out of the process.

The invention consists generally in various constructions and combinations all as hereinafter described and particularly pointed out in the claims.

In the accompanying drawings forming part of this specification,

Figure 1 is a view of a section of heavy tubing having a comparatively small central bore therethrough;

Figure 2 is a similar view showing how the core is milled lengthwise to form a series of comparatively deep grooves radiating from the center of the core and equally spaced apart substantially around the central bore;

Figure 3 is a view of a core having a tapered end;

Figure 4 is a view partially in section showing the longitudinal grooves in the core with sections of wire forming filler members placed in the grooves and in the central bore;

Figure 5 is a view partially in section showing the grooves converging or gradually increasing in depth toward the end of the tip;

Figure 6 shows a tip having tapered filler members fitting therein, the taper of these members conforming to that of the passages through the tip;

Figure 7 is a sectional view through the core showing the depth of the grooves formed therein;

Figure 8 is a similar view on the section line 8—8 of Figure 4;

Figure 9 is a transverse sectional view showing the tip when the swaging operation has been completed with the grooves fully closed and the wires or filler members therein;

Figure 10 is a cross-sectional view on the line 10—10 of Figure 11; with the filler members removed from the grooves;

Figure 11 is a longitudinal sectional view of the completed tip showing the means for mounting it on the torch and the relative position of the passages through the tip.

In the drawing, 2 represents a section of tubing, preferably of copper, having a central bore 3 extending longitudinally therein. In the peripheral surface of this core, I form, preferably by milling, a series of longitudinally arranged comparatively deep grooves 4 radiating from the center of the core and arranged an equal distance, substantially, apart around the central bore of the core. 5 represents a series of wire sections preferably cylindrical in form, and composed of piano wire. These sections are placed in the bottom of the grooves and in the central bore and the walls of the grooves are then swaged together by means of a suitable swaging implement, not shown.

The operation of forcing or swaging the walls of the grooves together will have the effect of closing the grooves over and around the wires and gripping them, the walls assuming a curved form corresponding to the curvature of the surface of the wires. When this has been done, the core and the wires are heated and then a longitudinal pull is applied to one end of the wires by a suitable mechanism, not shown, which will have the effect of slightly stretching the heated wires and causing the surfaces thereof to become separated from the walls of the passages formed in the grooves. This release of the wires from gripping engagement with the walls of the grooves and the walls of the central bore, allows the wires to be drawn endwise out of the core and when these wires have been withdrawn, a series of cylindrical passages 6 will be provided extending through the core from end to end centrally of the core and grouped an equal distance apart substantially around the central bore (see Figure 10). The bottoms of the grooves as formed in the core, will generally be square or rectangular in cross-section but when the walls are forced together by the swaging operation, they will conform to the curved surfaces of the wires and when the wires are removed, the passages in the grooves will be substantially cylindrical as when the core is formed by drilling, but the work will be performed in much less time and much less expense than when the core is drilled. A wire is placed in the central bore to prevent it from being closed during the swaging operation. When the swaging operation is completed, this central wire is heated with the others and then may be easily drawn out of the tip.

It may be desired in some instances to provide passages rectangular in cross section or polygonal, and in such case it is only necessary to use wires rectangular or polygonal in cross section and when the walls of the grooves are swaged together on the surfaces of these wires, they will conform to such surfaces and the passages, when the wires have been removed, will be rectangular or polygonal in cross section corresponding to the surfaces of the wires.

To provide passages with converging ends, the core is tapered at one end so that when the longitudinal grooves are milled or cut therein, they will converge from the point where the direction of the passages is changed and the wires are laid in these grooves and the swaging operation performed in substantially the same manner as when the grooves extend in a straight line from end to end of the core.

When the swaging operation has been completed, the tapered core and the wires embedded therein will be heated to a predetermined degree and then a longitudinal pulling strain is applied to the larger end of the wires and they will be drawn out of the core in the same manner as described with reference to the previous figures, leaving a series of longitudinal gas passages in the core corresponding in cross sectional area substantially to the diameter of the filler wires.

The surfaces of the filler members or wires may be coated with oil or grease when they are placed in the grooves of the core to facilitate the withdrawal of the wires from the tip when the swaging operation has been completed. By using a suitable device for pulling the wires out of the tip core, it may be practicable to perform this operation without first heating the tip and the wires. I do not, therefore, wish to confine myself in this application to the heating of the wires and tip as a necessary step of the process as it may be practicable to dispense entirely with this step in the manufacture of the article.

I have found that this swaging operation can be performed neatly and expeditiously, the walls of the grooves being pressed so snugly together that there will be no chance for the escape of gas at the point where the grooves were made and the joints will hardly be visible when the tip is completed.

The passages formed by the withdrawal of the filler wires will of course correspond to the shape of the wires and be of a gauge suitable for the passage of gas to the tip. The rear end of the completed tip is provided with a threaded area 3$^a$ for convenience of attachment of the tip to the head of the torch.

In Figure 5, I have shown the grooves 4$^a$ gradually increasing in depth toward the nozzle end of the tip. The filler wires 5 are inserted in these grooves in a manner similar to that shown in Figure 4, but when the wires are removed from the core after the swaging operation, the gas passages will be straight the entire length of the core.

In Figure 6, there is illustrated a tip construction wherein the filler wires 5$^a$, inserted in the longitudinal grooves of the core, are tapered towards the top end of the core so that after the swaging operation and the filler wires are removed, the passages 6$^a$ will be correspondingly tapered, as shown in the lower portion of Figure 6.

I claim as my invention:

1. A process of making oxy-fuel gas tips which consists in providing a core, forming a series of longitudinal grooves spaced apart therein, placing filler members in the bottoms of said grooves, swaging the walls of said grooves to close them over and around said filler members and then drawing said filler members lengthwise from the core to provide a corresponding number of longitudinal passages therein.

2. A process of forming an oxy-fuel tip which consists in providing a core, forming a series of longitudinal grooves in the core lengthwise thereof, placing filler members in the bottoms of said grooves, swaging the walls of said grooves to close them over and around said filler members, then heating the core and said filler members and drawing the filler members lengthwise from the core to provide a series of passages therethrough.

3. A process of forming an oxy-fuel tip which consists in providing a core having a tapered end and a central longitudinal bore therethrough, forming a series of grooves in the surface of said core lengthwise thereof, the grooves at the tapered end of the core converging around the central bore, placing filler members in said grooves and central bore swaging the walls of the grooves together over said filler members and then drawing the filler members lengthwise from said grooves and bore to form a series of longitudinal passages through the core.

4. A process of forming an oxy-fuel tip which consists in providing a core, forming a series of longitudinal grooves lengthwise at intervals in the surface of the core, placing sections of cylindrical piano wire in the bottoms of said grooves, swaging the walls of the grooves together over and around the surfaces of the wires, heating the core and the wires and then pulling the wires lengthwise from the core to provide a series of longitudinal passages therethrough.

5. A process of forming an oxy-fuel tip which consists in providing a core having a central bore therethrough, forming a series of longitudinal grooves in the surface of the core lengthwise thereof around said central bore, placing filler members in the bottoms of said grooves and in said bore, swaging the walls of said core to close said grooves and said bore around said filler members, then heating the core and said filler members and drawing the filler lengthwise from said bore and from the grooves formed around it to provide a series of continuous passages through the core.

6. A process of forming an oxy-fuel tip which consists in providing a core having a central bore therethrough, forming a series of longitudinal grooves in the surface of the core lengthwise thereof around said central bore, placing filler members in the bottom of said grooves and in said bore, swaging the walls of said core to close said grooves and said bore around said filler members, then heating the core and said filler members and drawing the filler lengthwise from said bore and from the grooves formed around it to provide a series of continuous passages through the core, one end of said core being tapered, and said grooves and the fillers therein being inclined or converging at one end to conform to said taper.

7. A process of making oxy-fuel tips which consists in providing a core, forming a series of grooves therein, placing filler members in each groove, swaging the walls of said grooves to close them over and around said filler members, withdrawing said filler members, and then immersing the core in an electroplating bath until a shell of the desired thickness has been formed.

8. A process of forming an oxy-fuel tip which consists in providing a core having a tapered end and a central longitudinal bore therethrough, forming a series of grooves in the surface of said core lengthwise from one end to the other thereof, the grooves at the tapered end of the core converging toward the central bore, placing filler members in said grooves and central bore, swaging the walls of the grooves together over those filler members in the grooves, then drawing the filler members lengthwise from said grooves, and finally depositing a finishing layer of metal about the swaged portions.

9. A process of forming an oxy-fuel tip which consists in providing a core, forming a series of longitudinal grooves lengthwise of the core, placing sections of wire in the grooves, swaging the walls of the grooves over and around the wires, heating the core and withdrawing the wires, and finally immersing the core in an electroplating bath and depositing a metal shell of the desired thickness about the swaged area of the core.

10. A process of forming an oxy-fuel tip, which consists in providing a core having a central bore forming a series of grooves in the surface of the core, extending substantially in the same direction as the central bore, placing filler members in the grooves and in said bore, swaging the walls of the core about the filler members of the grooves, heating the core and filler members to release the members for withdrawal, and then electrolytically depositing a shell about the swaged portion of the core.

11. A process of forming an oxy-fuel tip which consists in providing a core having a bore, forming a series of grooves in the surface of the core, all spaced from the bore, placing filler members in the grooves, swaging the metal of the core about the filler members, heating the core to loosen the filling members, then withdrawing said members, and finally electrolytically depositing a finishing shell about the core.

In witness whereof, I have hereunto set my hand this 2nd day of August, 1926.

ELMER H. SMITH.